United States Patent
Pennemann et al.

(10) Patent No.: US 12,441,614 B2
(45) Date of Patent: Oct. 14, 2025

(54) METHOD OF CLEANING AN APPARATUS USED IN THE CONCENTRATION OF A MINERAL ACID

(71) Applicant: Covestro Intellectual Property GmbH & Co. KG, Leverkusen (DE)

(72) Inventors: Bernd Pennemann, Bergisch Gladbach (DE); Kameh Tajvidi, Neuss (DE)

(73) Assignee: Covestro Deutschland AG, Leverkusen (DE)

( * ) Notice: Subject to any disclaimer, the term of this patent is extended or adjusted under 35 U.S.C. 154(b) by 754 days.

(21) Appl. No.: 17/783,375

(22) PCT Filed: Dec. 16, 2020

(86) PCT No.: PCT/EP2020/086459
§ 371 (c)(1),
(2) Date: Jun. 8, 2022

(87) PCT Pub. No.: WO2021/122773
PCT Pub. Date: Jun. 24, 2021

(65) Prior Publication Data
US 2023/0016848 A1  Jan. 19, 2023

(30) Foreign Application Priority Data
Dec. 18, 2019 (EP) .................................. 19217596

(51) Int. Cl.
*B08B 3/08* (2006.01)
*B01B 1/00* (2006.01)
(Continued)

(52) U.S. Cl.
CPC .............. *C01B 17/88* (2013.01); *B01B 1/005* (2013.01); *B01D 3/148* (2013.01); *B01D 53/263* (2013.01);
(Continued)

(58) Field of Classification Search
None
See application file for complete search history.

(56) References Cited

U.S. PATENT DOCUMENTS 3,536,081 A * 10/1970 Riess .................... B08B 9/0323
134/22.12
6,568,406 B2   5/2003 Aichinger et al.
(Continued)

FOREIGN PATENT DOCUMENTS

CN        104745337 A       7/2015
DE    102013021026    *    6/2015
(Continued)

OTHER PUBLICATIONS

Translation of DE102013021026 by Winterbauer, published Jun. 25, 2015.*
(Continued)

*Primary Examiner* — Kaj K Olsen
*Assistant Examiner* — Ryan L Coleman
(74) *Attorney, Agent, or Firm* — Donald R. Palladino

(57) ABSTRACT

The present invention relates to a method for preparing an apparatus (or a plant comprising a plurality of apparatuses), for example a heat exchanger, a vaporizer or a distillation column, for use in a process (in particular a continuously operated process) for concentrating a mineral acid by evaporation of water, wherein the apparatus or the plant comprises (at least) a device which is resistant to the mineral acid and the device is flushed with an aqueous alkali metal hydroxide solution having a concentration by mass of alkali metal hydroxide in the range from 1% to 30% at a temperature in the range from 40° C. to 90° C. for a time of from 2 hours to 7 days.

15 Claims, 1 Drawing Sheet

(51) Int. Cl.
    *B01D 3/14*    (2006.01)
    *B01D 53/26*    (2006.01)
    *B01D 53/28*    (2006.01)
    *C01B 17/88*    (2006.01)
    *C01B 21/44*    (2006.01)
    *C07C 201/08*    (2006.01)
    *F28G 9/00*    (2006.01)

(52) U.S. Cl.
    CPC .............. *B01D 53/28* (2013.01); *C01B 21/44* (2013.01); *C07C 201/08* (2013.01); *F28G 9/00* (2013.01)

(56) References Cited

U.S. PATENT DOCUMENTS

| | | |
|---|---|---|
| 2012/0168298 A1 | 7/2012 | Dichtl et al. |
| 2015/0368592 A1 | 12/2015 | Cabanas et al. |
| 2017/0218322 A1* | 8/2017 | Um ........................ C12M 29/18 |

FOREIGN PATENT DOCUMENTS

| | | |
|---|---|---|
| EP | 0330351 A1 | 8/1989 |
| JP | 2018151132 | 9/2018 |
| KR | 20190004557 | 1/2019 |
| WO | WO2010035673 * | 4/2010 |

OTHER PUBLICATIONS

Translation of WO2010035673 by Kawaguchi, published Apr. 1, 2010.*
Kirk Othmer, Encyclopedia of Chemical Technology, 4th Ed., vol. 1, pp. 301-302, 1991.
International Search Report, PCT/EP2020/086459, date of mailing: Feb. 1, 2021, Authorized officer: Jochen Gerwann.
VDI-Wärmeatlas, 10th ed., Springer-Verlag Berlin, Heidelberg, 2006, ISBN-10 3-540-25504-4, p. OD 23, paragraph 5.1.1 and pp. OD 26-Od 27, paragraph 5.2.

* cited by examiner

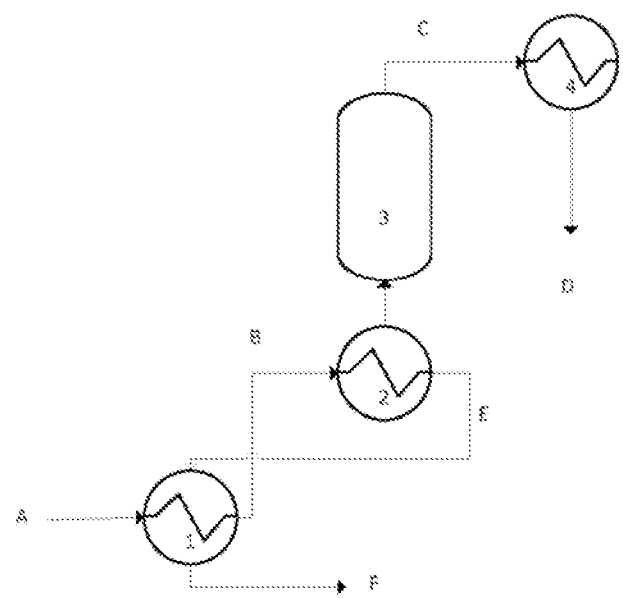

METHOD OF CLEANING AN APPARATUS USED IN THE CONCENTRATION OF A MINERAL ACID

CROSS-REFERENCE TO RELATED APPLICATION

This application is a national stage application under 35 U.S.C. § 371 of PCT/EP2020/086459, filed Dec. 16, 2020, which claims the benefit of European Application No. 19217596.6, filed Dec. 18, 2019, which is incorporated herein by reference.

FIELD

The present invention relates to a method for preparing an apparatus (or a plant comprising a plurality of apparatuses), for example a heat exchanger, a vaporizer or a distillation column, for use in a process (in particular a continuously operated process) for concentrating a mineral acid by evaporation of water, wherein the apparatus or the plant comprises (at least) a device which is resistant to the mineral acid and the device is flushed with an aqueous alkali metal hydroxide solution having a concentration by mass of alkali metal hydroxide in the range from 1% to 30% at a temperature in the range from 40° C. to 90° C. for a time of from 2 hours to 7 days.

BACKGROUND

Apparatuses which are used in concentrating a mineral acid (for example heat exchangers, vaporizers or distillation columns) are required in processes in which a mineral acid is employed and the mineral acid is diluted during the course of this use but is not (at least not completely) consumed. In order to allow reuse of the mineral acid, this has to be concentrated again to the original concentration (and optionally purified). Thus, for example, sulfuric acid is employed in various fields of use in which it is not chemically consumed but is diluted with water, for instance when used as desiccant or as catalyst in reactions in which water is formed. Certain constituents of the apparatuses used for concentrating the mineral acid inevitably come into direct contact with the mineral acid during operation of the apparatuses. For this reason, such apparatuses always comprise devices which are made of or at least coated with acid-resistant materials. On the basis of experience, the acid-resistant devices, in particular, of such apparatuses have to be cleaned regularly, in particular in order to remove deposits of solids.

For this purpose, it is customary to at least partially disassemble the apparatus or even the acid-resistant devices themselves and where necessary clean it/them with water under high pressure. However, since the required acid-resistant materials will have some sensitivity to mechanical stresses, this can lead to damage. In addition, a cleaning method which requires mechanical disassembly even of only individual components of the apparatus is naturally inconvenient and highly time-consuming.

Cleaning without disassembly at least of individual components and without mechanical stresses is not realistically possible using water alone. However, the use of cleaning chemicals is limited by the resistance of the materials used.

CN 104745337 A describes a neutral chemical cleaner for removing hard deposits on an air preheater of a desulfurization system and a process for producing the neutral chemical cleaner.

The VDI-Wärmeatlas (10th edition, Springer Verlag 2006, ISBN-10 3-540-25504-4) discloses, on page Od 23 in paragraph 5.1.1, as general procedure, firstly the removal of organic deposits using an alkali, then washing-out with water, followed by loosening or dissolution using an acid, another rinsing with water and subsequent passivation. In Example 9, it is additionally stated that, in a particular case, the treatment of silicon dioxide-containing and calcium phosphate-containing deposits with a combination of sodium hydroxide solution and a wetting agent at 100° C. makes these more readily soluble. This is followed by treatment with hydrochloric acid and ammonium bifluoride at 70° C.; here, the ammonium bifluoride produces a small amount of hydrofluoric acid which dissolves the silicon dioxide.

The Korean patent application KR 2019 0004557 A is concerned with a method for improving the acid resistance of a shell-and-tube heat exchanger in which air or water is to be heated indirectly by means of a heating gas. Here, the air to be heated or the water to be heated flows through the interior of the heating tubes, while the heating gas flows around them on the outside. Since a gas containing acidic constituents is to be used as heating gas, there is a risk that deposition of these acidic constituents on the outside of the heating tubes and consequently corrosion will occur due to the cooling of the heating gas. According to the teaching of KR 2019 0004557, such corrosion is prevented by a special coating on the outside of the tubes. For this purpose, the heating tubes are coated with a glaze and subsequently calcined. The glaze used is a mixture comprising silicon dioxide, a nanometal having a linear structure, various metal oxides and metal salts and also wood charcoal obtained from the pyrolysis of biomass, a pigment, in particular inorganic pigment, and silicone oil. To prepare for application of the glaze, the surface of the heating tubes can be treated with a pickling liquid containing sulfuric acid, ascorbic acid and an anion exchange resin. The document does not address concentrating mineral acids with heating thereof. Rather, the acid-containing heating gas is cooled in the method described. The document likewise does not address cleaning of the heat exchanger to be used, but instead only how the heat exchanger is to be configured for minimum susceptibility to corrosion.

The Japanese patent application JP 2018 151132 A is concerned with a method for cleaning a heat exchanger, in which cleaning using a first cleaning liquid is firstly carried out, and this is followed by cleaning using a second cleaning liquid. The method provided is, in particular, one by which the progress of cleaning can be monitored and is particularly suitable for heat exchangers which are susceptible to formation of calcium- or silicon-containing deposits during operation, for example water heaters or heat exchangers for concentrating cleaning water for semiconductors. An aqueous solution containing a carboxylic acid, sulfamic acid, methanesulfonic acid and/or salts thereof is particularly suitable as first cleaning liquid. In one embodiment, aqueous solutions of a hydrogendifluoride such as ammonium, potassium or sodium hydrogendifluoride are described as second cleaning liquid, while another embodiment provides for the use of alkaline solutions such as sodium or potassium hydroxide. The preferred embodiment depends on the material of the heat exchanger. Thus, the use of the latter embodiment using alkaline cleaning liquids is recommended for heat exchangers which consist of stainless steel or titanium. The document is not concerned with heat exchangers in which mineral acids are to be concentrated.

The international patent application WO 2011/032659 A1 concerns a method and a plant for the work-up, i.e. fractionation, cleaning and concentration, of used and water-diluted sulfuric acid from nitration processes ("waste acid") in which nitric acid in the presence of sulfuric acid is used as nitrating medium. The method is, in particular, characterized in that the preheated waste acid, in a first stage, is separated in a stripping column into at least one gaseous phase containing nitric acid and possibly nitroorganics, and a preconcentrated sulfuric acid, and, in subsequent process stages, (i) the preconcentrated sulfuric acid is passed to further purification for separating off nitroorganics and a higher degree of concentration and (ii) the nitric acid obtained from the gaseous nitric acid phase and the nitroorganics, including the nitroorganics obtained in the further purification and concentration of the preconcentrated sulfuric acid, are worked up and recirculated to the nitration process, where concentration of the nitric acid present in the stripping vapor is carried out in addition to the stripping of the preheated waste acid in the first stage of the method, and where the nitric acid vapors obtained at the top of the column of the first stage are condensed and a nitric acid is obtained directly in a highly concentrated form which is suitable for recirculation to the nitration process.

The prior art indicated above does not solve the problems indicated at the outset. There is therefore a need for further improvements in the field of cleaning of apparatuses which are used in concentrating mineral acids. In particular, it is desirable to provide a cleaning method which is simple to carry out, makes it possible to dispense as far as possible with disassembly of components of the apparatus to be cleaned and causes a minimum degree of damage to the acid-resistant materials, either by mechanical stresses or chemical stresses.

SUMMARY

Taking account of this need, the present invention provides a method for preparing an apparatus (or a plant comprising a plurality of apparatuses) for use in a process (in particular continuously operating process) for concentrating a mineral acid by evaporation of water (i.e. a method for cleaning the apparatus of the plant or a part thereof) in such a way that the apparatus or the plant can be used in such a process for concentrating a mineral acid),
  wherein the apparatus comprises (at least) a device which is resistant to the mineral acid,
  wherein the device has coatings selected from the group consisting of the materials steel enamel, silicon carbide, glass (in particular borosilicate glass), tantalum, niobium, perfluorinated polymers (in particular polytetrafluoroethylene and/or perfluoroalkoxy polymers) and a composite of two or more of these materials,
  or
  wherein the device is made of (at least) one of these materials,
  comprising a step of flushing the device with an aqueous alkali metal hydroxide solution having a concentration by mass (based on the total mass of the alkali metal hydroxide solution) of alkali metal hydroxide in the range from 1% to 30% at a temperature in the range from 40° C. to 90° C. for a time of from 2 hours to 7 days.

BRIEF DESCRIPTION OF THE DRAWINGS

Various features and characteristics of the inventions described in this specification may be better understood by reference to the accompanying FIGURE, in which FIG. 1 shows, in simplified form, a plant for concentrating waste acid from a process for nitration of toluene to give dinitrotoluene (DNT).

DETAILED DESCRIPTION

In the terminology of the present invention, an acid-resistant device is a constituent of the apparatus which comes into direct contact with the mineral acid to be concentrated, for example the inside or outside of a tube of a shell-and-tube heat exchanger. The term apparatus as used for the purposes of the present invention also encompasses the case where a plurality of individual plant components which each qualify as apparatus in the sense used here are joined together to form an integrated system of a plurality of apparatuses, also referred to as plant. In such a case, a plant can of course comprise further plant components in addition to the apparatuses to be cleaned.

There first follows a brief summary of various possible embodiments of the invention:

In a first embodiment of the invention, which can be combined with all other embodiments, the alkali metal hydroxide solution is selected from the group consisting of sodium hydroxide solution, potassium hydroxide solution and mixtures thereof.

In a second embodiment of the invention, which can be combined with all other embodiments, the concentration by mass of alkali metal hydroxide in the alkali metal hydroxide solution is in the range from 3% to 20%.

In a third embodiment of the invention, which is a particular variant of the second embodiment, the concentration by mass of alkali metal hydroxide in the alkali metal hydroxide solution is in the range from 5% to 15%.

In a fourth embodiment of the invention, which can be combined with all other embodiments, flushing is carried out at a temperature in the range from 50° C. to 80° C.

In a fifth embodiment of the invention, which is a particular variant of the fourth embodiment, flushing is carried out at a temperature in the range from 55° C. to 70° C.

In a sixth embodiment of the invention, which can be combined with all other embodiments, flushing is carried out for a time of from 8 hours to 30 hours.

In a seventh embodiment of the invention, which is a particular variant of the sixth embodiment, flushing is carried out for a time of from 12 hours to 24 hours.

In an eighth embodiment of the invention, which can be combined with all other embodiments, the apparatus comprises a heat exchanger for heating the mineral acid to be concentrated, a distillation apparatus for removing organic impurities from the mineral acid to be concentrated, a vaporization apparatus (with a plurality of vaporization apparatuses being able to be connected in series), a heat exchanger for cooling the mineral acid which has been concentrated and/or a vessel for accommodating the mineral acid which has been concentrated.

In a ninth embodiment of the invention, which is a particular variant of the eighth embodiment, the apparatus is a heat exchanger designed for heating the mineral acid to be concentrated and/or for cooling the mineral acid which has been concentrated.

In a tenth embodiment of the invention, which is a further particular variant of the eighth embodiment, the apparatus comprises a heat exchanger for cooling the mineral acid which has been concentrated and a vessel further downstream for accommodating the mineral acid which has been concentrated.

In an eleventh embodiment of the invention, which can be combined with all other embodiments, the mineral acid is selected from the group consisting of sulfuric acid, nitric acid and mixtures thereof.

In a twelfth embodiment of the invention, which is a particular variant of the eleventh embodiment, the process of concentrating the mineral acid by evaporation of water is used to concentrate sulfuric acid, which is used as reaction medium in a nitration of an aromatic compound with nitric acid to obtain an aromatic nitro compound and is diluted by the nitration, back to its concentration originally used in the nitration. In other words, the process of concentrating the mineral acid by evaporation of water in this twelfth embodiment is a constituent part of a process for producing an aromatic nitro compound by nitration of an aromatic compound using nitric acid in the presence of sulfuric acid, where the process for concentrating the mineral acid is used for concentrating the sulfuric acid, which has been diluted in the course of the nitration, back to its concentration originally used in the nitration.

In a thirteenth embodiment of the invention, which is a particular variant of the twelfth embodiment, the aromatic nitro compound is nitrobenzene or dinitrotoluene, preferably dinitrotoluene.

In a fourteenth embodiment of the invention, which is a further particular variant of the eleventh embodiment, the process of concentrating the mineral acid by evaporation of water is used for concentrating sulfuric acid, which is used as desiccant for drying a gas and is diluted by the drying, back to its concentration originally used in the drying. In other words, the process for concentrating the mineral acid by evaporation of water in this fourteenth embodiment is a constituent part of a process for drying a gas in which sulfuric acid is used as desiccant, where the process for concentrating the mineral acid is used for concentrating sulfuric acid, which has been diluted during the course of drying, back to its concentration originally used in drying.

In a fifteenth embodiment of the invention, which is a particular variant of the fourteenth embodiment, the gas is chlorine.

In a sixteenth embodiment of the invention, which can be combined with all other embodiments, the device has coatings which comprise or consist of perfluorinated polymers (such as, in particular, polytetrafluorethylene and/or perfluoroalkoxy polymers) or the device is at least partly made of perfluorinated polymers (such as, in particular, polytetrafluorethylene and/or perfluoroalkoxy polymers), where the perfluorinated polymers (in both cases) are mechanically stabilized with inert materials (in particular glass spheres, glass beads or aluminate- or silicate-containing clay minerals).

In a seventeenth embodiment of the invention, which can be combined with all other embodiments, as long as these are not restricted to the use of perfluorinated polymers as materials which are resistant to the mineral acid, the device has coatings which comprise or consist of steel enamel, silicon carbide, glass (in particular borosilicate glass), niobium and/or tantalum or the device is at least partly made of steel enamel, silicon carbide, glass (in particular borosilicate glass), niobium and/or tantalum.

In a eighteenth embodiment of the invention, which can be combined with all other embodiments, the device is not disassembled for the purpose of carrying out the flushing.

In a nineteenth embodiment of the invention, which is a particular variant of the eighteenth embodiment, the (entire) apparatus is not disassembled for the purpose of carrying out the flushing of the device.

The embodiments briefly indicated above and further possible variants of the invention will be explained in more detail below. Various embodiments can be combined with one another in any way as long as the opposite is not clearly apparent to a person skilled in the art from the context.

As alkali metal hydroxide solution, preference is given to using sodium hydroxide solution and/or potassium hydroxide solution. Regardless of the type of alkali metal hydroxide solution used, the concentration by mass of alkali metal hydroxide in the solution is preferably in the range from 3% to 20% and particularly preferably in the range from 5% to 15%.

Flushing with the alkali metal hydroxide solution is preferably carried out at temperatures in the range from 50° C. to 80° C., particularly preferably in the range from 55° C. to 70° C., for a time of preferably from 8 hours to 30 hours, particularly preferably from 12 hours to 24 hours.

The method of the invention can in principle be applied to all apparatuses which are employed in concentrating mineral acids. Thus, the apparatus in question can be a heat exchanger for heating the mineral acid to be concentrated, a distillation apparatus for removing organic impurities from the mineral acid to be concentrated, a vaporization apparatus (with a plurality of vaporization apparatuses being able to be connected in series), a heat exchanger for cooling the mineral acid which has been concentrated and/or a vessel for accommodating the mineral acid which has been concentrated. Here and in the following, formulations such as "a heat exchanger", "a distillation apparatus" and the like naturally encompass the possibility of a plurality of such apparatuses being present and being cleaned using the method of the invention.

In a preferred embodiment of the invention, the cleaning method of the invention is used for cleaning a heat exchanger which is designed for heating the mineral acid to be concentrated and/or for cooling the mineral acid which has been concentrated. The cleaning method of the invention is also suitable for cleaning a plant which comprises a heat exchanger for cooling the mineral acid which has been concentrated and a vessel downstream thereof for accommodating the mineral acid which has been concentrated.

In principle, the cleaning method of the invention can be applied to apparatuses for concentrating any mineral acids. Particular preference is given to sulfuric acid, nitric acid and mixtures thereof. Sulfuric acid and nitric acid are employed in the production of an aromatic nitro compound by nitration of aromatic compounds. The nitric acid serves as source of the nitro group, while the sulfuric acid functions as catalyst and diluent. In adiabatically operated processes, the sulfuric acid also takes up the (considerable) heat of reaction.

In processes for nitrating aromatics, the aromatic to be nitrated is preferably used in excess so that the nitric acid is consumed completely (except for possible traces). However, the sulfuric acid is merely diluted and should, possibly with the exception of small proportions which are discharged in order to remove impurities, be recirculated, after concentration to the concentration originally used in the nitration, back to the nitration process.

Benzene and toluene are particularly suitable as aromatics to be nitrated. Benzene here is mononitrated to nitrobenzene and toluene is dinitrated to dinitrotoluene. Preference is given to employing the method of the invention in the production dinitrotoluene.

Another field of use for the method of the invention is processes in which sulfuric acid is used as desiccant for drying gas and is diluted in the course thereof. In such processes, the sulfuric acid which has taken up a certain amount of water has to be concentrated back to the concentration originally used in drying. The drying of moist chlorine gas may be mentioned as an example of such a use.

If perfluorinated polymers are used as acid-resistant materials, preference is given to polytetrafluoroethylene and/or perfluoroalkoxy polymers. Particularly when such polymers are used not merely as coatings, but instead the devices which come into contact with the mineral acid are made of such polymers, the perfluorinated polymers are preferably mechanically stabilized with inert materials. As inert materials, preference is given to glass spheres or beads or else aluminate- or silicate-containing clay minerals.

Other suitable acid-resistant materials are steel enamel, silicon carbide, glass (in particular borosilicate glass), niobium and/or tantalum. These can be used as coatings or as material of which the devices coming into contact with the mineral acid are made.

If the acid-resistant material is used only as coating, the materials used for the devices which come into contact with the mineral acid during operation of the apparatus and to which the coatings are applied can be all materials with which a person skilled in the art is familiar, in particular stainless steel or black steel.

The method of the invention offers the great advantage that it can be carried out without disassembly of the device to be flushed. However, it can be necessary to disconnect pipes which connect the individual devices to one another or connect the device to other constituent parts of the apparatus or further plant components. The alkali metal hydroxide solution can be introduced via entry openings which are present in any case (for instance the entry opening for introduction of the mineral acid to be concentrated in normal operation of the apparatus) and be discharged via exit openings which are present in any case (for instance for discharge of the mineral acid which has been concentrated in normal operation of the apparatus). However, it is of course also possible for closable entry and exit openings (which are closed during normal operation of the apparatus) provided especially for the purpose of flushing to be installed at suitable places on the apparatus, so that these have to be opened only for the purpose of flushing. In such a case, it is possible that the apparatus does not even have to be partly disassembled (i.e. all pipes present in normal operation can remain installed).

The method of the invention will be illustrated below with the aid of examples.

EXAMPLES

A plant for concentrating waste acid from a process for nitration of toluene to give dinitrotoluene (DNT) is shown in simplified form in FIG. 1. It consists of a plurality of recuperators (1), a plurality of vaporizers (2) which are each connected to columns (3) and condensers (4) (just one of these plant components is shown in each case). The inflow of the waste acid is denoted by A, the acid which has been concentrated by F and the process condensate by D. Severe fouling of the heat exchangers (1) was found, so that the hot concentrated acid, denoted by E, from the vaporizer (2) could no longer flow out freely, as is necessary for operation, through the heat exchangers (1). In addition, it was observed that the heat transfer through the heat exchangers (1) was considerably reduced, which could be seen from a reduced temperature of the stream B, an increased temperature of the stream F and an increased energy consumption by the vaporizer (2).

The heat exchangers (1) were firstly flushed with water and subsequently with 10% strength sodium hydroxide solution. For this purpose, the parts of the two pipes B and E which are in each case connected to nozzles on the last of the heat exchangers (1) were disconnected and the two nozzles were connected by a hose. During this operation, the nozzles were inspected and large amounts of solid deposits were found. The sodium hydroxide solution which had been heated to 65° C. was subsequently pumped from a reservoir for 24 hours through the flushing nozzles located on the heat exchanger (1) in the pipe F and taken off at a flushing nozzle located in the pipe A and returned to the reservoir. After another brief flushing with water, the hose was disconnected and the nozzles were inspected again. No fouling was observed any longer; accordingly, cleaning was complete. The pipes which had been disconnected were connected again and the plant was started up again. It was found here that the acid could again flow out freely and the heat transfer through the heat exchangers (1) corresponds to the design value.

The invention claimed is:

1. A method for preparing and using an apparatus comprising an acid-resistant device,
   wherein the acid-resistant device has a coating comprising steel enamel, silicon carbide, glass, tantalum, niobium, a perfluorinated polymer, or a composite of two or more thereof,
   or
   wherein the acid-resistant device is made of one of steel enamel, silicon carbide, glass, tantalum, niobium, a perfluorinated polymer, or a composite of two or more thereof,
   the method comprising:
   (a) flushing the acid-resistant device with an aqueous alkali metal hydroxide solution having a concentration by mass of alkali metal in the range from 1% to 30% at a temperature in the range from 40° C. to 90° C. for a time of from 2 hours to 7 days; and then subsequently
   (b) using the apparatus comprising the acid-resistant device flushed in step (a) in a process of concentrating a mineral acid by evaporation of water, wherein said process comprises contacting the acid-resistant device with the mineral acid during the concentrating of the mineral acid or wherein said process comprises contacting the acid-resistant device with the mineral acid while the mineral acid has a concentration that was increased as a result of said concentrating of the mineral acid.

2. The method as claimed in claim 1, wherein the alkali metal hydroxide solution comprises sodium hydroxide solution, potassium hydroxide solution, or a mixture thereof.

3. The method as claimed in claim 1, wherein the flushing is carried out for a time of from 8 hours to 30 hours.

4. The method as claimed in claim 1, wherein the acid-resistant device comprises a heat exchanger for heating the mineral acid, a distillation apparatus for removing organic compounds from the mineral acid, a vaporization apparatus, a heat exchanger for cooling the mineral acid after the mineral acid has been concentrated and/or a vessel for accommodating the mineral acid after the mineral acid has been concentrated.

5. The method as claimed in claim 4, wherein the acid-resistant device is a heat exchanger which is designed for heating the mineral acid and/or for cooling the mineral acid after the mineral acid has been concentrated.

6. The method as claimed in claim 4, wherein the acid-resistant device comprises a heat exchanger for cooling the mineral acid after the mineral acid has been concentrated and a vessel downstream thereof for accommodating the mineral acid after the mineral acid has been concentrated.

7. The method as claimed in claim 1, wherein the mineral acid comprises sulfuric acid, nitric acid, or a mixture thereof.

8. The method as claimed in claim 7, wherein the process of concentrating the mineral acid by evaporation of water comprises concentrating sulfuric acid that is used as a catalyst and diluent in a nitration of an aromatic compound with nitric acid to obtain an aromatic nitro compound.

9. The method as claimed in claim 8, wherein the aromatic nitro compound comprises nitrobenzene or dinitrotoluene.

10. The method as claimed in claim 7, wherein the process of concentrating the mineral acid by evaporation of water is used for concentrating sulfuric acid that has been diluted by use of the sulfuric acid as a desiccant for drying a gas.

11. The method as claimed in claim 10, wherein the gas comprises chlorine.

12. The method as claimed in claim 1, wherein the acid-resistant device comprises a coating comprising a perfluorinated polymer or wherein the acid-resistant device is made at least partly of a perfluorinated polymer, where the perfluorinated polymer is mechanically stabilized with an inert material.

13. The method as claimed in claim 1, wherein the acid-resistant device comprises a coating comprising steel enamel, silicon carbide, glass, niobium and/or tantalum or wherein the acid-resistant device is made at least partly of steel enamel, silicon carbide, glass, niobium and/or tantalum.

14. The method as claimed in claim 1, wherein the acid-resistant device is not disassembled for the purpose of carrying out the flushing.

15. The method as claimed in claim 14, wherein the apparatus is not disassembled for the purpose of carrying out the flushing of the acid-resistant device.

\* \* \* \* \*